(12) United States Patent
Segeren et al.

(10) Patent No.: US 12,510,914 B2
(45) Date of Patent: Dec. 30, 2025

(54) PEDAL PAD ASSEMBLIES, RETAINING ASSEMBLIES, AND SENSOR ASSEMBLIES THEREIN

(71) Applicant: KSR IP Holdings, LLC, Wilmington, DE (US)

(72) Inventors: Jason Segeren, Blenheim (CA); Shaun Fuller, Thamesville (CA)

(73) Assignee: KSR IP Holdings, LLC, Wilmington, DE (US)

( * ) Notice: Subject to any disclaimer, the term of this patent is extended or adjusted under 35 U.S.C. 154(b) by 0 days.

(21) Appl. No.: 18/767,162

(22) Filed: Jul. 9, 2024

(65) Prior Publication Data

US 2025/0021124 A1 Jan. 16, 2025

Related U.S. Application Data

(60) Provisional application No. 63/526,290, filed on Jul. 12, 2023.

(51) Int. Cl.
*G05G 1/38* (2008.04)
*G05G 5/03* (2008.04)

(52) U.S. Cl.
CPC ............. *G05G 1/38* (2013.01); *G05G 5/03* (2013.01); *G05G 2505/00* (2013.01)

(58) Field of Classification Search
None
See application file for complete search history.

(56) References Cited

U.S. PATENT DOCUMENTS

| | | | |
|---|---|---|---|
| 5,768,946 A | 6/1998 | Fromer | |
| 7,404,342 B2 * | 7/2008 | Wurn | G05G 5/03 74/512 |
| 7,503,236 B2 | 3/2009 | Schlabach | |
| 8,042,430 B2 | 10/2011 | Campbell | |
| 8,650,984 B2 | 2/2014 | O'Neill | |
| 10,173,650 B1 | 1/2019 | Harrison et al. | |
| 2006/0185468 A1 | 8/2006 | Richardson | |
| 2008/0149411 A1 * | 6/2008 | Schlabach | G05G 1/38 180/315 |

(Continued)

FOREIGN PATENT DOCUMENTS

| | | |
|---|---|---|
| DE | 102004025829 B4 | 7/2006 |
| JP | 2015089731 A | 5/2015 |
| JP | 2018161984 A | 10/2018 |

*Primary Examiner* — Vicky A Johnson
(74) *Attorney, Agent, or Firm* — Dinsmore & Shohl LLP (57) ABSTRACT

Embodiments herein are directed to a pedal assembly including a housing, a retaining assembly, and a pedal arm. The retaining assembly includes a first member having a first receiving cavity and a first sensor assembly and a second member having a second receiving cavity and a second sensor assembly. A first protrusion extends from one side of a pivot end of a pedal arm to be movably received within the first receiving cavity and a second protrusion extending from the opposite side of the one side of the pivot end to be movably received within the second receiving cavity. When a force applied on the pedal pad end moves the first protrusion within the first receiving cavity and the second protrusion within the second receiving cavity, the first sensor assembly and the second sensor assembly independently sense the movement of the first protrusion and the second protrusion respectively.

21 Claims, 9 Drawing Sheets

(56) References Cited

U.S. PATENT DOCUMENTS

| | | |
|---|---|---|
| 2010/0206122 A1 | 8/2010 | Seiltz |
| 2015/0192076 A1 | 7/2015 | Jordan |
| 2022/0379723 A1 | 12/2022 | Vyskocil |
| 2022/0379852 A1* | 12/2022 | O'Neill .................... G05G 1/44 |
| 2023/0159008 A1 | 5/2023 | Kauz |

* cited by examiner

PEDAL PAD ASSEMBLIES, RETAINING ASSEMBLIES, AND SENSOR ASSEMBLIES THEREIN

CROSS-REFERENCE TO RELATED APPLICATIONS

This utility patent application claims priority benefit from U.S. provisional patent application Ser. No. 63/526,290, filed Jul. 12, 2023, and entitled "Integrated Pivot Pedal Emulator", the entire contents of which is incorporated by reference herein in its entirety.

TECHNICAL FIELD

The present specification generally relates to pedal assemblies for vehicles and, more specifically, to pedal assemblies with integrated pivot pins and sensor components.

BACKGROUND

It is generally known in pedal assemblies to use a pivot pin to couple a pedal arm to a housing to permit the pedal arm to pivot about the pivot pin relative to the housing when a load is applied or removed from a pedal pad. However, pivot pins are additional parts and costs, the pivot pin needs to be keyed to a pedal arm, the housing is more complex, and sensor assemblies are more complex and not protected from outside elements and changes in air gaps. Accordingly, there is a need for pedal assembly with an integrated pivot pin and sensor components.

SUMMARY

In one embodiment, a pedal assembly is provided. The pedal assembly includes a housing, a retaining assembly, and a pedal arm. The retaining assembly is configured to removably couple to the housing. The retaining assembly includes a first member having a first receiving cavity and a first sensor assembly and a second member having a second receiving cavity and a second sensor assembly. The pedal arm has a pedal pad end and an opposite pivot end. A first protrusion extending from one side of the pivot end to be movably received within the first receiving cavity and a second protrusion extending from the opposite side of the one side of the pivot end to be movably received within the second receiving cavity. When a force applied on the pedal pad end moves the first protrusion within the first receiving cavity and the second protrusion within the second receiving cavity, the first sensor assembly and the second sensor assembly independently sense the movement of the first protrusion and the second protrusion respectively.

In another embodiment, an assembly is provided. The assembly includes a housing, a first member, a second member, and a pedal arm. The housing has a retaining recess. The retaining recess has a pair of spaced apart protrusions extending from an upper surface. The first member has a first receiving cavity, a first sensor assembly, and a first receiving groove configured to receive one of the pair of spaced apart protrusions when positioned within the retaining recess. The second member has a second receiving cavity, a second sensor assembly and a second receiving groove configured to receive the other one of the pair of spaced apart protrusions when positioned within the retaining recess. The pedal arm has a pivot end. The pivot end has an integrated first protrusion and second protrusion extending from opposite sides of the pivot end. The first protrusion is movably received within the first receiving cavity and the second protrusion is movably received within the second receiving cavity. A movement of the pivot end moves the first protrusion within the first receiving cavity and the second protrusion within the second receiving cavity and the first sensor assembly and the second sensor assembly independently detect the movement of the first protrusion and the second protrusion respectively.

In another embodiment, a pedal assembly is provided. The pedal assembly includes a housing, a first member, a second member, a pedal arm, and an emulator assembly. The first member is removably coupled to the housing. The first member has a first receiving cavity and a first sensor assembly. The second member is removably coupled to the housing. The second member has a second receiving cavity and a second sensor assembly. The first sensor assembly utilizing a different sensing technology than the second sensor assembly. The pedal arm has a pedal pad end and an opposite pivot end. A first protrusion extends from one side of the pivot end to be movably received within the first receiving cavity and a second protrusion extends from the opposite side of the one side of the pivot end to be movably received within the second receiving cavity. The emulator assembly is coupled to the pedal arm. The emulator assembly is configured to provide a pedal effort force against a depression travel arc of the pedal arm as a force is applied at the pedal pad end. Wherein a force is applied on the pedal pad end moves the first protrusion within the first receiving cavity and the second protrusion within the second receiving cavity, the first sensor assembly and the second sensor assembly independently sense the movement of the first protrusion and the second protrusion respectively.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to pedal assemblies that utilize an integrated pivot portion extending from a proximate end of a pedal arm, which is received in within a retaining assembly. The retaining assembly incudes a pair of removably coupled members that are positioned within a housing. The pedal assemblies further include an emulator assembly configured to provide a force feedback to a driver's foot since the pedal assemblies are not connected to a conventional hydraulic system. Further, redundant sensor assemblies are adapted to sense position and/or force applied to a pedal pad using different sensing technologies. One of the sensor assemblies is positioned within one of the pair of removably coupled members and the other one of the sensor assemblies is positioned within the other one of the pair of removably coupled members. Accordingly, this arrangement permits for a less complicated and more compact pedal assembly compared to conventional pedal assemblies. Further, the sensor assemblies provided herein may have better correlation because of reduced mechanical losses between the pivot pins and the sensors for measuring the movement of the pivot pins. There are also fewer possible failure modes that could result in total loss of sensing. Additionally, embodiments described herein are directed to one of the pair of sensing assemblies to utilize inductive sensing technology while the other one of the pair of sensing assemblies utilize Hall Effect sensing technologies. Further, the retaining assembly therefore may be used in multiple pedal designs and/or may be scalable to reduce tooling cost and allows for the design herein to the tuned such that there is a reduced complexity compared to multi piece assemblies and reduces part tolerances permitting for a more robust assembly output.

As used herein, the term "communicatively coupled" means that coupled components are capable of exchanging data signals with one another such as, for example, electrical signals via conductive medium or a non-conductive medium, though networks such as via Wi-Fi, Bluetooth, and the like, electromagnetic signals via air, optical signals via optical waveguides, and the like.

As used herein, "disposed on" means that a component is in direct contact with another component. A component "disposed on" or "disposed within" another component may be deposited, formed, placed, or otherwise applied directly onto/within the other component. In other words, if a component is disposed on a second component, there are no components disposed between the first component and the second component.

As used herein, the term "proximal" or "first end" means closer to or in the direction of an origin of an element, such as a link member. The term "distal" or "second end" means further from the origin of the element. Put another way, the terms "distal" or "second end" mean opposite to the proximal end or first end of an element.

Figure 1:
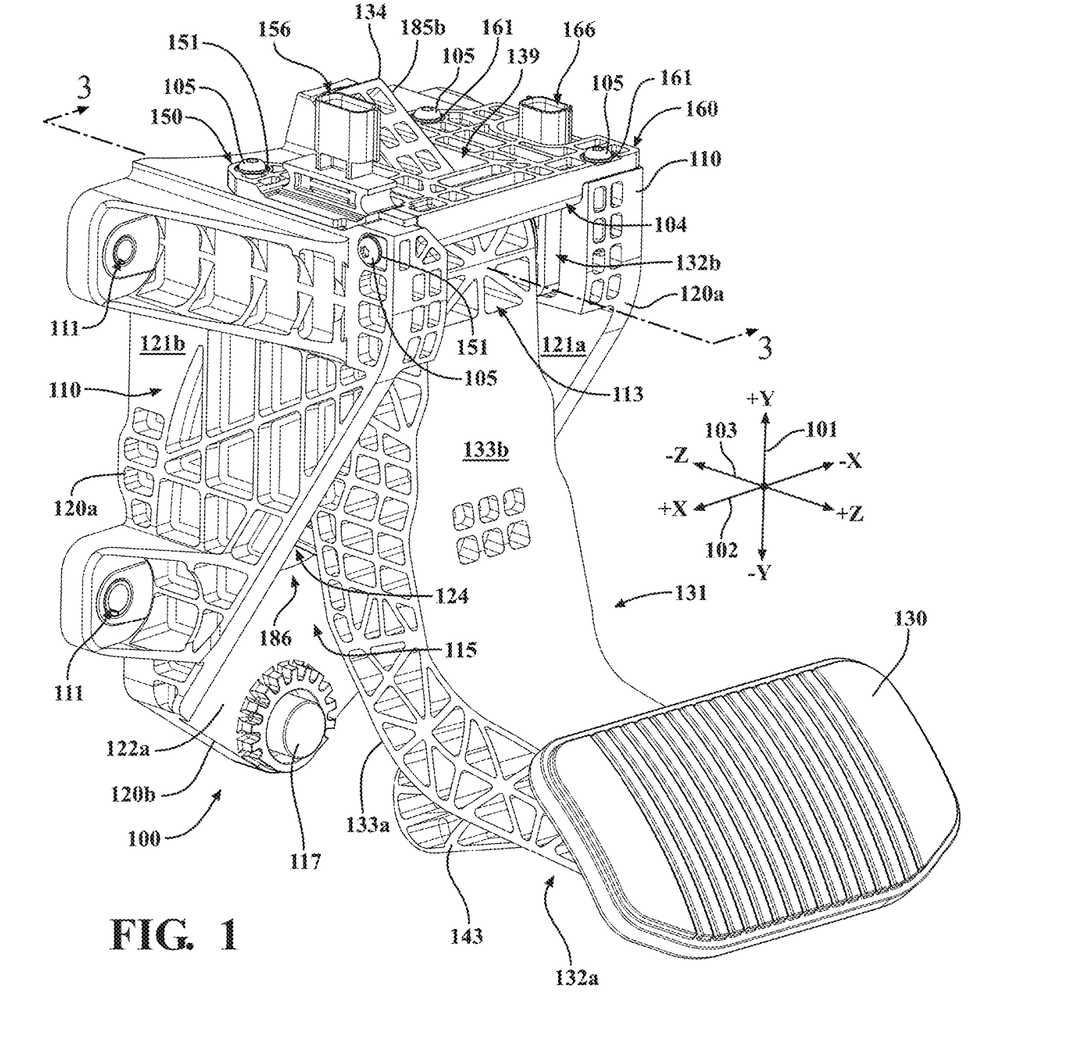
FIG. 1 schematically depicts a perspective view of an example pedal assembly according to one or more embodiments shown and described herein.
Figure 2:
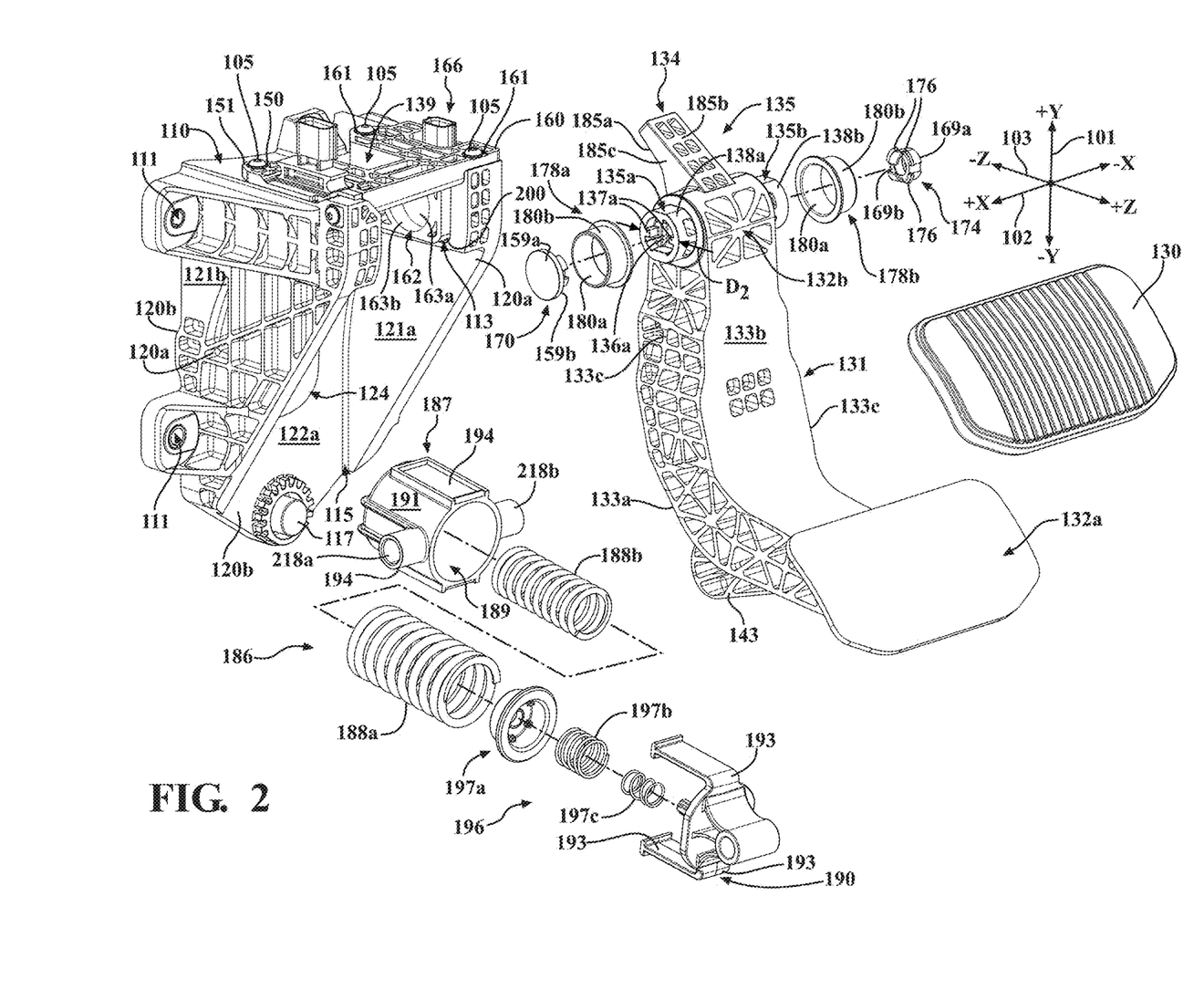
FIG. 2 schematically depicts a partially exploded perspective view of the example pedal assembly of FIG. 1 according to one or more embodiments shown and described herein.
Figure 3:
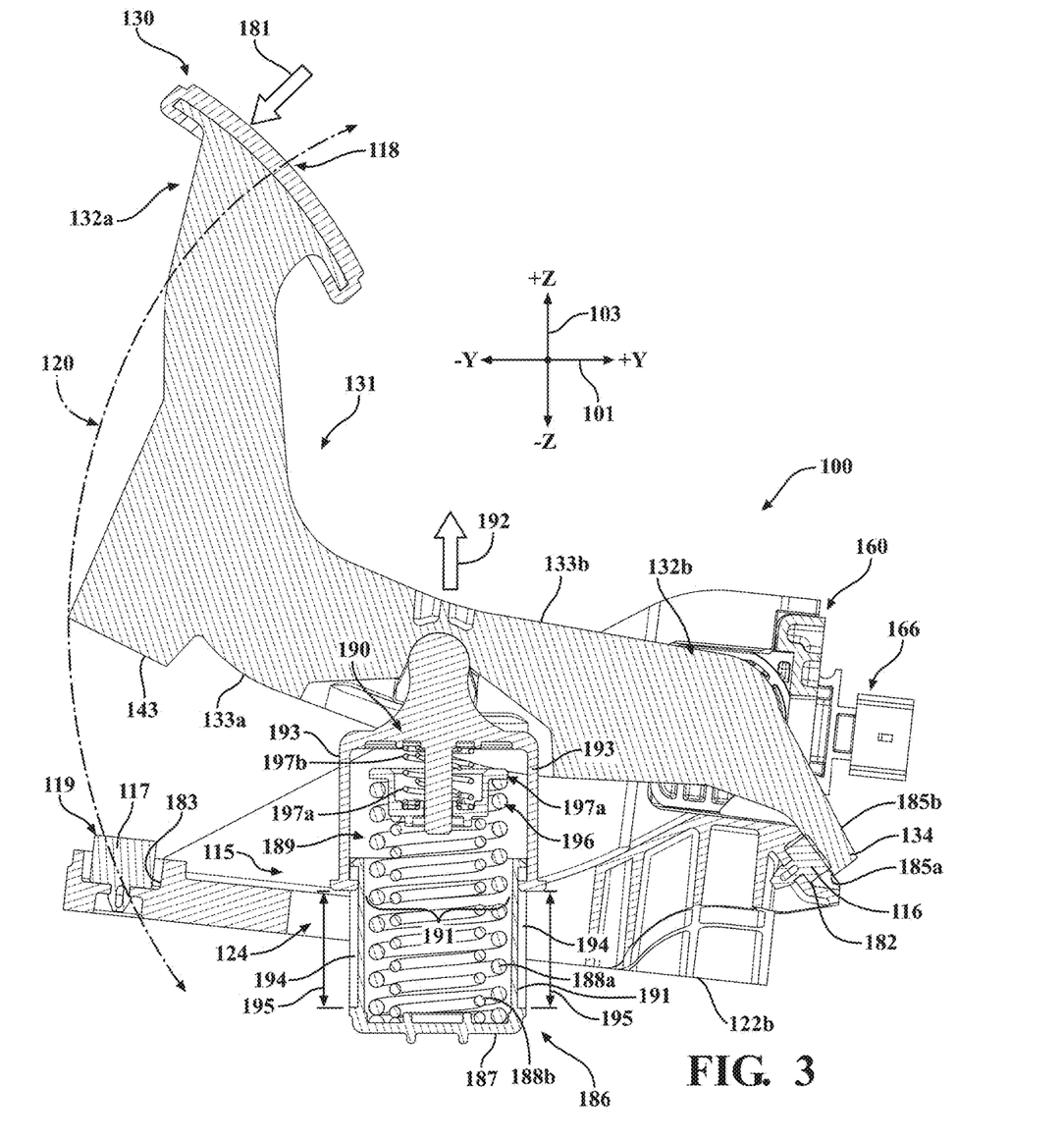
FIG. 3 schematically depicts a cross-sectional view of the pedal assembly of FIG. 1 taken from line 3-3 with the pedal assembly in a resting position, according to one or more embodiments shown and described herein.

Now referring to FIGS. 1-3, an example pedal assembly 100 is schematically depicted. As used herein, the term "longitudinal direction" refers to the cross-direction of the example pedal assembly 100 (i.e., in a +/−X direction of the coordinate axes depicted in FIG. 1 as arrow 102). The term "lateral direction" refers to the forward-rearward direction of the example pedal assembly 100 (i.e., along the Z axis of the coordinate axes depicted in FIG. 1 as arrow 103), and is transverse to the longitudinal direction. The term "vertical direction" refers to the upward-downward direction of the example pedal assembly 100 (i.e., in the +/−Y direction of the coordinate axes depicted in FIG. 1 as arrow 101).

As shown in FIGS. 1 and 2 and FIGS. 4A-4B, the pedal assembly 100 may include a retaining assembly 104 and a housing 110. The housing 110 may be configured to removably mount to an external surface or other vehicle components, such as, but not limited to, an instrument panel (IP), a firewall, and/or the like. The housing 110 may be configured to mount to the external surface through a plurality of mounting apertures 111, each of the plurality of mounting apertures 111 sized to receive at least one fastener. For example, and without limitation, each of the plurality of mounting apertures 111 may receive a screw, rivet, bolt, adhesive, weld, hook and loop, and/or the like.

The retaining assembly 104 may be configured to removably couple to the housing 110, such as, in some embodiments, by the retaining assembly 104 slotting into a retaining recess 113 of the housing 110 that is configured to receive the retaining assembly 104. That is, the retaining recess 113 of the housing 110 is sized and shaped to receive portions of the retaining assembly 104 to removable couple the retaining assembly 104 to the housing 110, as discussed in greater detail herein.

Still referring to FIGS. 1, 2 and 4A-4B, the retaining assembly 104 may include a first member 150 and a second member 160. In some embodiments, each of the first member 150 and the second member 160 may include at least one coupling bore 151, 161, respectively, to removably couple each of the first member 150 and the second member 160 to the housing 110. In a non-limiting example, a fastener 105 may be positioned within the at least one coupling bore 151, 161, to releasably couple the each of the first member 150 and the second member 160 to the housing 110. Example fasteners include, without limitation, a screw, rivet, bolt, adhesive, weld, hook and loop, and/or the like.

Referring back to FIGS. 1-3, the example pedal assembly 100 may further include a pedal arm 131 and an emulator assembly 186 (FIG. 2) positioned within a cavity 115 of the housing 110 and extending between the pedal arm 131 and the housing 110, as best illustrated in FIG. 3. The cavity 115 of the housing 110 may be defined by a pair of sidewalls 120a that have an inner surface 121a and an opposite outer surface 121b and a rear wall 120b that has an interior surface 122a and an opposite exterior surface 122b. In some embodiments, a bore 124 extends through the interior surface 122a and the exterior surface 122b of the rear wall 120b to provide access to the cavity 115 from the bore 124.

The pedal arm 131 may include a pedal pad end 132a and an opposite pivot end 132b. Further, the pedal arm 131 may be a monolithic structure that includes an innermost surface 133a and an opposite outermost surface 133b that is spaced apart by a pair of side surfaces 133c to define a thickness of the pedal arm 131. The pedal pad end 132a may be configured to receive a pedal pad 130. The pedal arm 131 may include an elongated portion 134 that is curvilinear or arcuate in shape and extending from the pivot end 132b. In some embodiments, the elongated portion 134 may be received within an opening 139 defined by the second member 160 such that the elongated portion 134 may curve or bend through and within the opening 139 in the vertical direction (i.e., in the +/−Y direction indicated by arrow 101) in a direction away from the housing 110. In some embodiments, the elongated portion 134 may be a monolithic structure formed as a single structure with the pedal arm 131. In other embodiments, the elongated portion 134 may be coupled or otherwise attached to the pivot end 132b of the pedal arm via at least one fastener. Example fasteners include, without limitation, bolt and nut, screw, rivet, weld, adhesive, epoxy, and/or the like.

As best illustrated in FIG. 2, the pivot end 132b of the pedal arm 131 may include a pair of pair of protrusions 135. One protrusion 135a extends from one side surface 133c of the pedal arm 131 and the other protrusions 135b extends from the other one side surface 133c of the pedal arm 131. As such, each of the protrusion 135a and the other protrusions 135b extend perpendicular to the innermost surface 133a and the outermost surface 133b of the pedal arm 131, such as in the longitudinal direction (e.g., in the +/−X direction depicted by arrow 102). This is non-limiting and the protrusions 135a, 135b may extend in any direction, at any angle, and not necessarily perpendicular to the innermost surface 133a and the outermost surface 133b of the pedal arm 131.

Each of the protrusions 135a, 135b may be tubular or cylindrical in shape, and include an outer surface 138a, 138b, respectively, although other shapes are contemplated. For example, and without limitation, frusto-variations thereof, elliptical, hexagonal, octagonal, and/or the like are contemplated. Each of the protrusions 135a, 135b may also include terminating surfaces 136a, 136b, respectively, that when received within a first receiving cavity 152 of the first member 150 and a second receiving cavity 162 of the second member 160 face an inner terminating surface 153a, 163a of the first receiving cavity 152 and the second receiving cavity 162, respectively, as discussed in greater detail herein. Further, the first receiving cavity 152 of the first member 150 and the second receiving cavity 162 of the second member 160 may be defined by a continuous wall surface 153b, 163b, which has a diameter D1 larger than a diameter D2 of each of the protrusions 135a, 135b, to receive a bushing 178a, 178b and the respective protrusion 135a, 135b, as discussed in greater detail herein.

Further, a plurality of members 137a, 137b, extend from the terminating surfaces 136a, 136b, respectively to engage with a coupler carrier member 170, as discussed in greater detail herein. In some embodiments, the plurality of members 137a, 137b may be rigid. In other embodiments, the plurality of members 137a, 137b may be semi-rigid or resilient.

The protrusions 135a, 135b, as well as any of the other portions or components of the protrusions 135a, 135b and the pedal arm 131 may be integrated with one another, i.e., may be a single monolithic structure that is formed together, such as by using injection molding techniques, additive manufacturing, and/or the like As used herein, "additive manufacturing" refers generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt base superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

Figure 5:
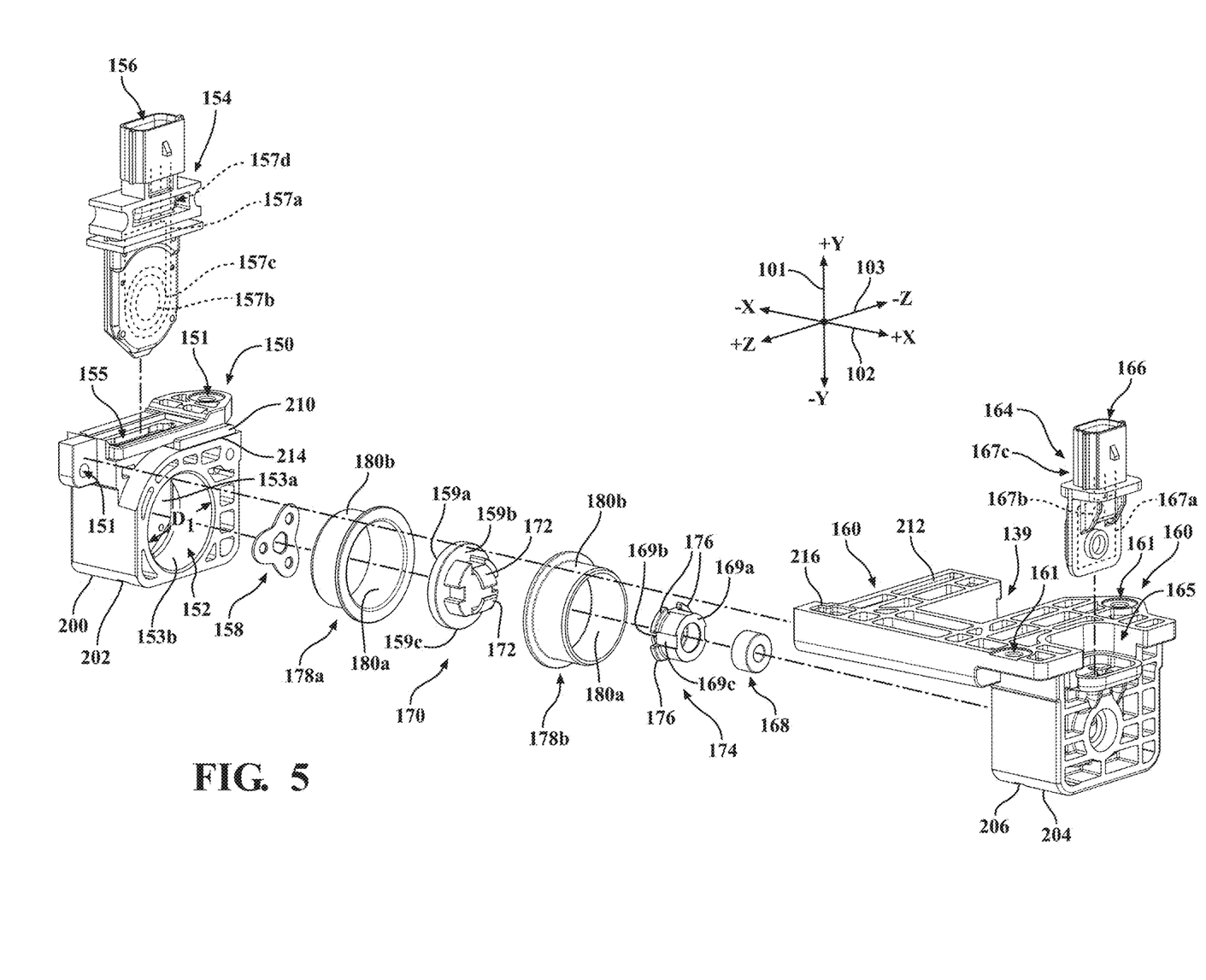
FIG. 5 schematically depicts an exploded perspective view of a first member and a second member of a retaining assembly of the pedal assembly of FIG. 1, according to one or more embodiments shown and described herein.
Figure 7:
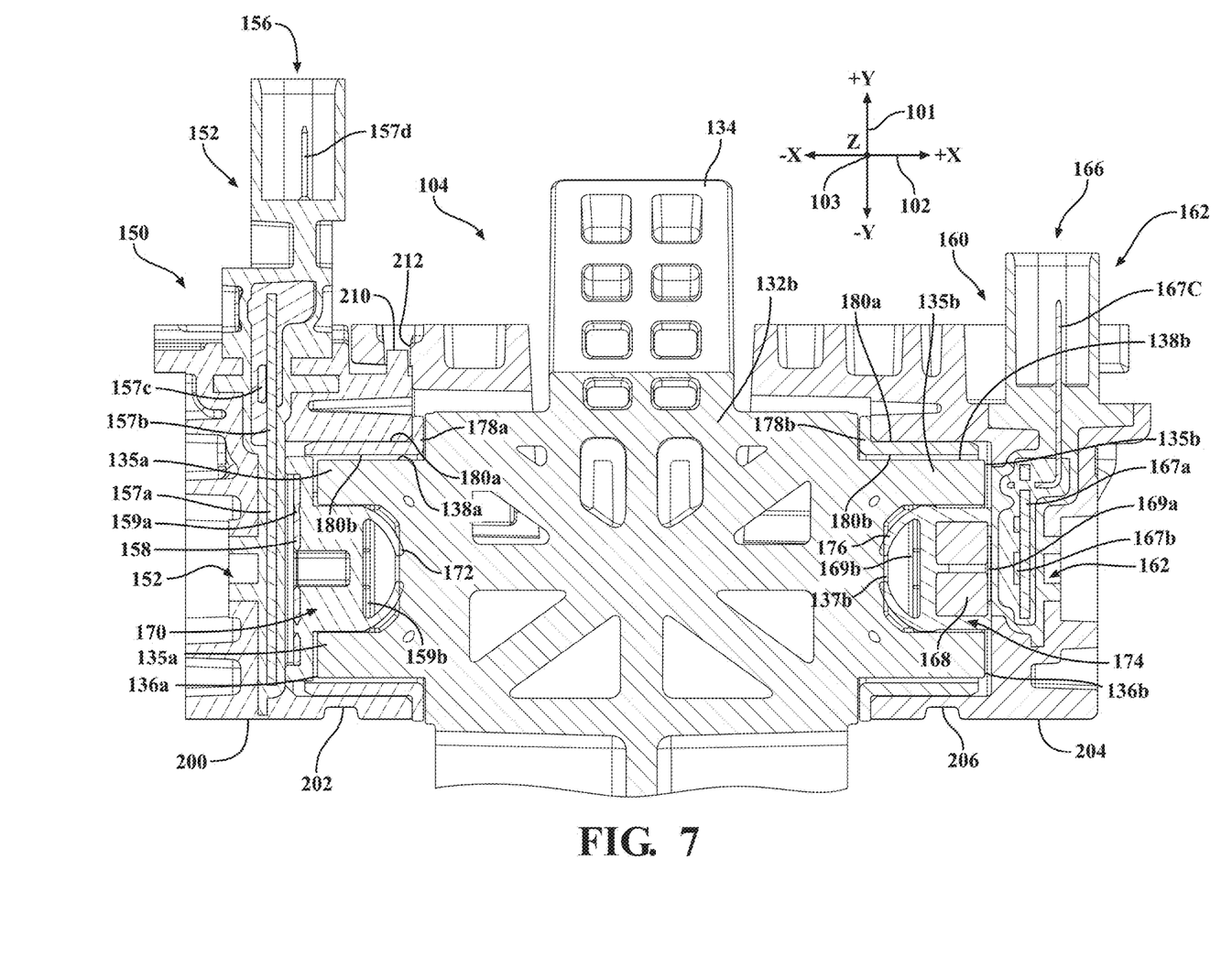
FIG. 7 schematically depicts a cross-sectional view of the retaining assembly of FIG. 6 taken from line 7-7, according to one more embodiments shown and described herein.

Now referring to FIGS. 2, 5 and 7, the first member 150 and the second member 160 may include the first receiving cavity 152 and the second receiving cavity 162, respectively. The receiving cavities 152, 162 are configured to receive the protrusions 135a, 135b of the pedal arm 131 in the first member 150 and the second member 160, respectively, as described in further detail below. As also shown in FIG. 5, the first member 150 and the second member 160 may include a first sensor assembly 154 and a second sensor assembly 164 respectively. The first sensor assembly 154 and the second sensor assembly 164 may have portion of the sensor assembly aligned with the first receiving cavity 152 and the second receiving cavity 162 respectively, to measure movement of the protrusions 135a, 135b of the pedal arm 131, as described in further detail herein.

As best depicted in FIG. 5, the first sensor assembly 154 may be removably coupled to a sensor opening 155 positioned to extend through an upper surface 214 of the first member 150. The first sensor assembly 154 may be an inductive type sensor that includes a printed wiring assembly 157a and a connector housing 156 extending from the upper surface 214 of the first member 150. The printed wiring assembly 157a may include a circuit board (or a printed circuit board), which may include at least one receiver coil 157b, a transmitter coil 157c, and a plurality of terminal pins 157d extending therefrom. A coupler 158 may be mounted, attached or otherwise received within a predetermined groove that is sized and shape to match the coupler 158 on a face surface 159a of a coupler carrier member 170. Opposite of the face surface 159a of the coupler carrier member 170 is a coupling surface 159b. A plurality of resilient members 172 extend from the coupling surface 159b and are configured to engage with the terminating surface 136a of the protrusion 135a. As such, the plurality of resilient members 172 are configured to preload the coupler carrier member 170 via a biasing effect, toward the sensor assembly 154 in at least the longitudinal direction (i.e., in the +/−X direction) to control an air gap between the coupler 158 and the sensor assembly 154 (e.g., transmitter coil 157c and at least one receiver coil 157b). In some embodiments, the arigap is a predetermined space or gap based on the preload of the plurality of resilient members 172 between the coupler 158 and the sensor assembly 154. In other embodiments, the airgap is dynamic based on a number of factors including wear on the pivot end 132b. In some embodiments, an outer surface 159c of the coupler carrier member 170 is keyed to couple or otherwise lock or attach the coupler carrier member 170 to the plurality of members 137a extending from the terminating surface 136a of the protrusion 135a such that as the protrusion 135a moves, the coupler carrier member 170 and the coupler 158 also simultaneously move. In other embodiments, the coupler carrier member 170 may be coupled to the protrusion 135a in a friction fit, a tapered fit, spring-loaded features, and/or the like, to maintain the arigap and such that as the protrusion 135a moves, the coupler carrier member 170 and the coupler 158 also simultaneously moves. Further, in some embodiments the face surface 159a may include a recess in the shape of the coupler 158 to receive at least portions of the coupler 158 and assist in retaining the position of the coupler relating to the coupler carrier member 170.

In the assembled state, the coupler 158 may be positioned adjacent to the at least one receiver coil 157b. In some embodiments, the coupler 158 may include distinct lobes, such as three lobes as illustrated in FIG. 5. This is non-limiting and the coupler 158 may have more or less lobes, be circular, or other shapes, such as a half-moon, square, rectangular, and/or the like. The coupler 158 may move dependent on the pressure applied to the pedal pad 130 of the pedal arm 131, as discussed in greater detail herein.

The at least one receiver coil 157b and the transmitter coil 157c work in tandem such that the at least one receiver coil 157b detects movements of the coupler 158, which is then transmitted via the plurality of terminal pins 157d through a vehicle side contactor communicatively coupled to the plurality of terminal pins 157d positioned within the connector housing 156 to a vehicle side electronic control unit and/or powertrain controller.

In some embodiments, the portions of the first sensor assembly 154 may be overmolded to encapsulate and protect the one or more sensor components and may be used to couple the first sensor assembly 154 to the first member 150 via the sensor opening 155. In other embodiments, the first sensor assembly 154 is coupled to the first member 150 via at least one fastener, such as, without limitation, a screw, bolt and nut, rivet, adhesive, weld, epoxy, hook and loop, and/or the like.

Still referring to FIG. 5, the second sensor assembly 164 may be removably coupled to a sensor opening 165 positioned to extend through an upper surface 216 of the second member 160. The second sensor assembly 164 may be a Hall Effect type sensor. Optionally, the second sensor assembly 164 may include a printed wiring assembly 167a and/or a connector housing 166 extending from the upper surface 216 of the second member 160. The printed wiring assembly 167a may include a circuit board (or a printed circuit board), which may include at least one Hall Effect chip 167b and a plurality of terminal pins 167c extending therefrom. A target 168 may be mounted, attached or otherwise received within a predetermined groove that is sized and shape to match the target 168 on a face surface 169a of a target carrier member 174. Opposite of the face surface 169a of the target carrier member 174 is a coupling surface 169b. A plurality of resilient members 176 extend from the coupling surface 169b and are configured to engage with the terminating surface 136b of the protrusion 135b. As such, the plurality of resilient members 176 are configured to preload the target carrier member 174 via a biasing effect, toward the sensor assembly 164 in at least the longitudinal direction (i.e., in the +/−X direction) to control an air gap between the target 168 and the sensor assembly 164 (e.g., Hall Effect chip 167b). In some embodiments, the arigap is a predetermined space or gap based on the preload of the plurality of resilient members 176 between the target 168 and the sensor assembly 164. In other embodiments, the airgap is dynamic based on a number of factors including wear on the pivot end 132b. In some embodiments, an outer surface 169c of the target carrier member 174 is keyed to couple or otherwise lock or attach the target carrier member 174 to the plurality of members 137b extending from the terminating surface 136b of the protrusion 135b such that as the protrusion 135b moves, the target carrier member 176 and the target 168 also simultaneously move. In other embodiments, the target carrier member 176 may be coupled to the protrusion 135b in a friction fit, a tapered fit, spring-loaded features, and/or the like, to maintain the arigap and such that as the protrusion 135b moves, the target carrier member 174 and the target 168 also simultaneously moves.

As such, the second sensor assembly 164 utilizes Hall Effect sensing technologies to detect movement of the target 168. The at least one Hall Effect chip 167*b* is sensitive to a Hall effect detection of magnetic change, and to convert a displacement or angular measurement of the target 168, which may be a magnet, to an electronic or electromagnetic signal. This information is transmitted through the plurality of terminal pins 167*c* positioned within the connector housing 166 and to the vehicle side electronic control unit and/or the powertrain controller for processing. The target 168, depicted as a magnet, may be sized and shaped to be positioned near or adjacent to the protrusion 135*b* and adjacent to the at least one Hall Effect chip 167*b*. In some embodiments, the target 168 may be generally circular. In other embodiments, the target 168 may be a plurality of other shapes, such as rectangular, square, hexagonal, octagonal, and/or the like. The target 168 may move dependent on the pressure applied to the pedal pad 130 of the pedal arm 131, as discussed in greater detail herein.

In some embodiments, the portions of the second sensor assembly 164 may be overmolded to encapsulate and protect the one or more sensor components and may be used to couple the second sensor assembly 164 to the second member 160 via the sensor opening 165. In other embodiments, the second sensor assembly 164 is coupled to the second member 160 via at least one fastener, such as, without limitation, a screw, bolt and nut, rivet, adhesive, weld, epoxy, hook and loop, and/or the like.

It should be understood that the first sensor assembly 154 and the second sensor assembly 164 utilize different sensing technologies to simultaneously measure the movement of the pivot end 132*b* of the pedal arm 131 such that redundant sensing via the two different sensing technologies may occur. Further, because the redundant sensing described herein uses different sensing techniques, such an arrangement provides for a more robust redundant sensing compared to conventional systems.

Each of the first and second sensor assemblies 154, 164 may also include a wake-up circuitry that sends a signal on a detection of movement of the pedal arm 131 to initiate sensing of both the first sensor assembly 154 and the second sensor assembly 164. Further, the signal may be used by the vehicle side for a variety of functions such as, without limitation, initiating or "waking up" an electronic control unit.

Figure 6:
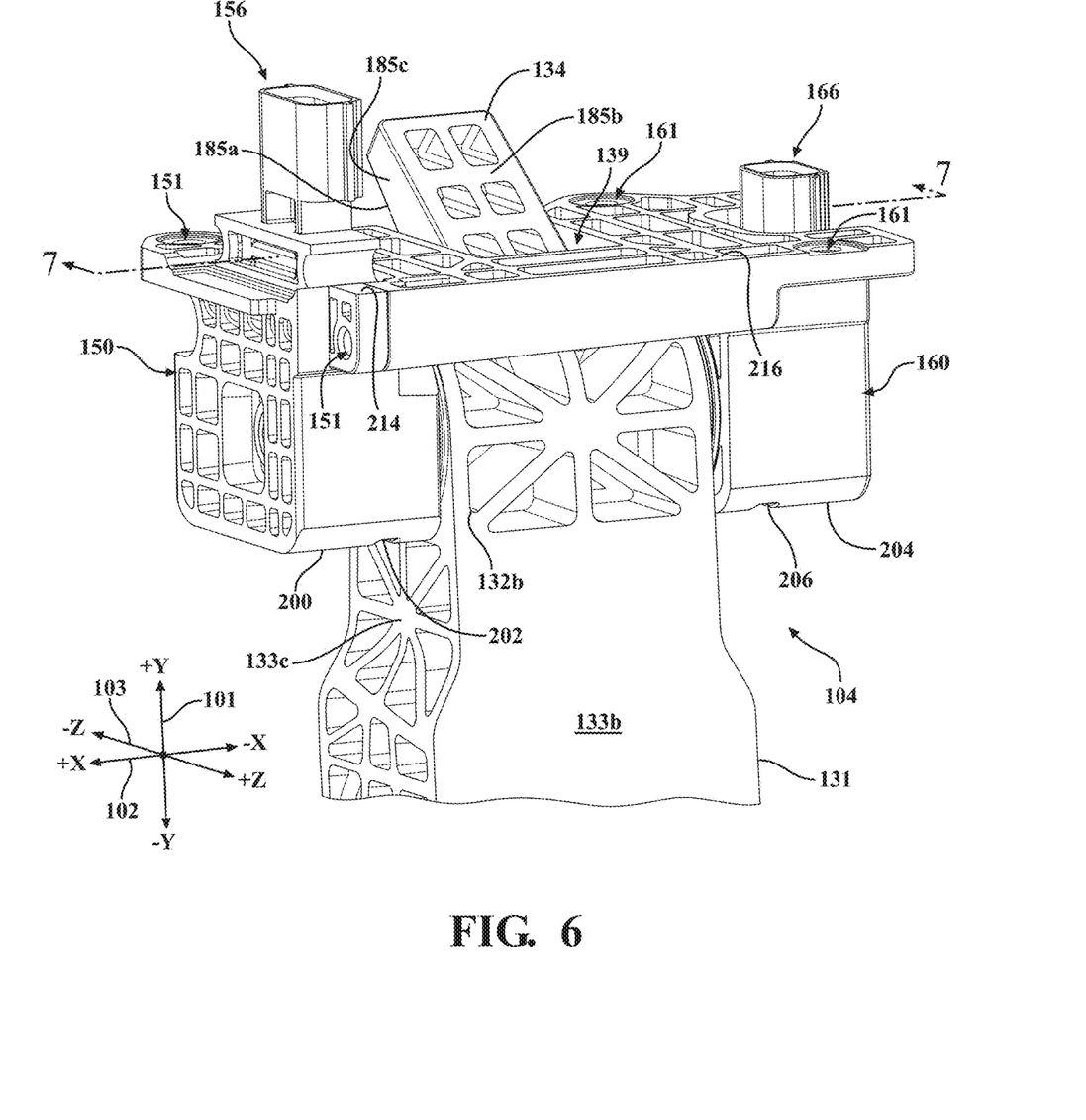
FIG. 6 schematically depicts a partial perspective view of the retaining assembly of the pedal assembly of FIG. 1 in an assembled state, according to one or more embodiments shown and described herein.
Figure 8:
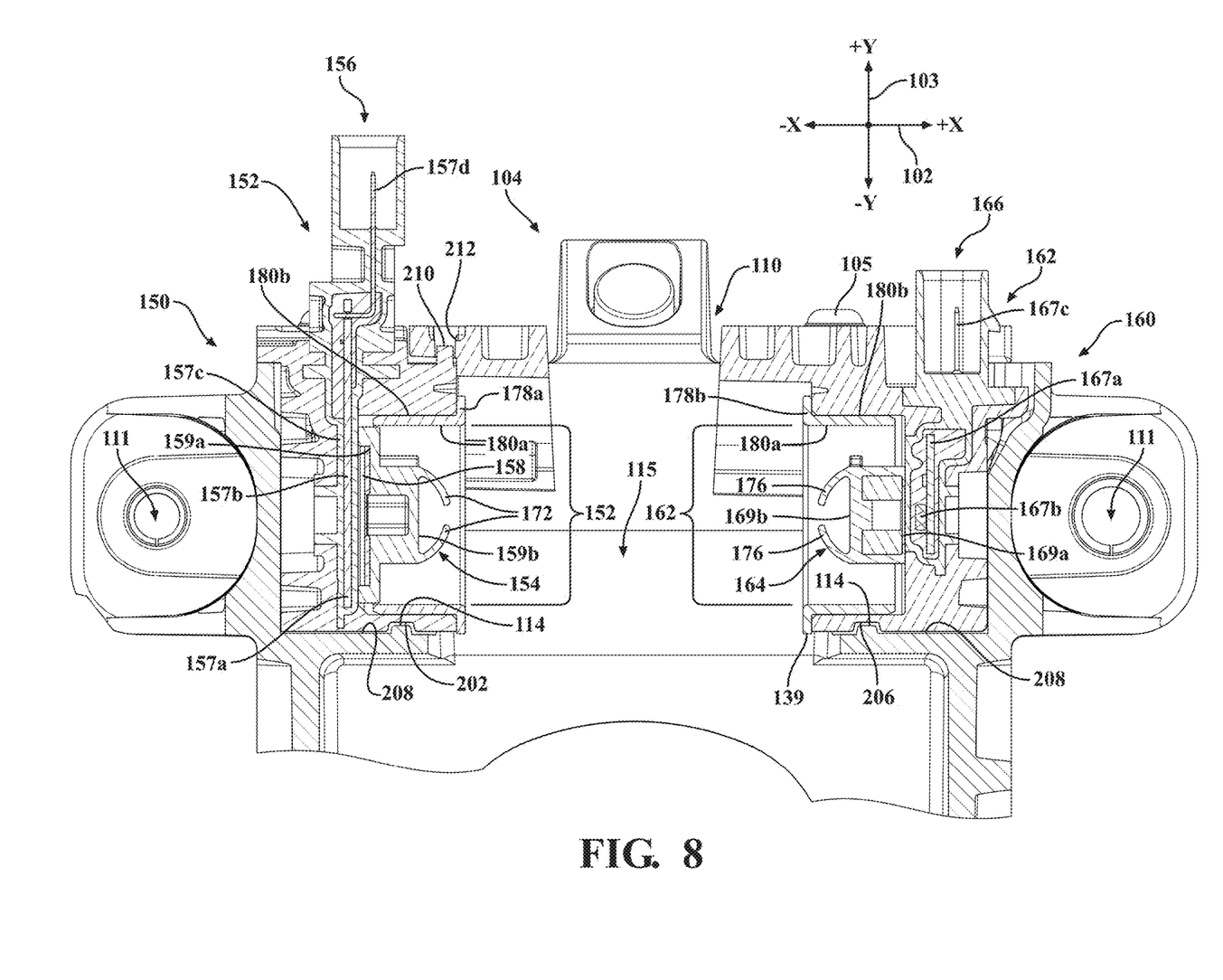
FIG. 8 schematically depicts a cross-sectional view of the retaining assembly of FIG. 4A taken from line 8-8, according to one more embodiments shown and described herein.

Referring back to FIGS. 1-2, and 5, and now referring to FIGS. 6-8, a bushing 178*a*, 178*b*, that has an inner surface 180*a* and an opposite outer surface 180*b* is configured to movably engage with the first receiving cavity 152 and the second receiving cavity 162, respectively and the outer surface 138*a*, 138*b* of the protrusions 135*a*, 135*b*, respectively. That is, the inner surface 180*a* of the bushing 178*a*, 178*b*, is configured to engage with the outer surface 138*a*, 138*b* of the protrusions 135*a*, 135*b*, respectively, and the outer surface 180*b* of the bushing 178*a*, 178*b*, is configured to engage with the continuous wall surface 153*b*, 163*b*, of the first receiving cavity 152 and the second receiving cavity 162 of the first member 150 and the second member 160, respectively. As such, the bushing 178*a*, 178*b* provides a barrier to contact with the continuous wall surface 153*b*, 163*b*, of the first receiving cavity 152 and the second receiving cavity 162 of the first member 150 and the second member 160, respectively for the protrusions 135*a*, 135*b*, respectively.

Because the protrusions 135*a*, 135*b* are movably received in the first receiving cavity 152 and the second receiving cavity 162, respectively, the first sensor assembly 154 and the second sensor assembly 164 are aligned with the first receiving cavity 152 and the second receiving cavity 162 respectively, such that portions of the first sensor assembly 154 and the second sensor assembly 164 may oppose the terminating surfaces 136*a*, 136*b* of the protrusions 135*a*, 135*b*, respectively, to accurately detect movement of the protrusions 135*a*, 135*b*. That is, the coupler 158, the transmitter coil 157*c*, the at least one receiver coil 157*b*, the bushing 178*a*, the coupler carrier member 170, and the protrusion 135*a* may be coaxially aligned. Further, the target 168, the at least one Hall Effect chip 167*b*, the bushing 178*b*, the target carrier member 174, and the protrusion 135*b* may be coaxially aligned.

In operation, a force, depicted by arrow 181 in FIG. 3, applied on the pedal pad end 132*a* may operate to move the one protrusion 135*a* within the first receiving cavity 152 and the other protrusion 135*b* within the second receiving cavity 162. The first sensor assembly 154 and the second sensor assembly 164 independently sense the movement, such as angular movement, of the one protrusion 135*a* and the other protrusion 135*b* respectively.

Now referring to FIG. 3, the elongated portion 134 includes a rear surface 185*a* and an opposite upper surface 185*b* spaced apart by a pair of side surfaces 185*c*. The housing 110 may further include an upstop 116 that may be opposed to the rear surface 185*a* of the elongated portion 134 and may protrude from the housing 110 such that the upstop 116 may contact with the rear surface 185*a* of the elongated portion 134 at a home or resting position, as depicted in FIG. 3. The upstop 116 may be formed by a resilient material such as, without limitation, rubber, silicone, and the like. Further, the upstop 116 may be positioned as least partially within a receiving recess 182 of the housing 110 in a snap fit configuration. This is non-limiting and the upstop 116 may be coupled to the housing 110 using a fastener such as, without limitation, a screw, bolt, rivet, barb, weld, epoxy, adhesive, and/or the like, or molded in place. Accordingly, as best shown in at least FIG. 3, the rear surface 185*a* of the elongated portion 134 may be configured to contact the upstop 116 at a resting position 118, thereby defining the resting position 118 of the pedal arm 131 along a depression travel arc illustrated by arrow 120 as the position where the pedal arm 131 is at home or a force 181 is not applied against the emulator assembly 186. That is, the size, shape and positioning of the elongated portion 134 may be utilized to set the resting position 118 of the pedal arm 131.

Further, the innermost surface 133*a* of the pedal arm 131 may further include and pedal arm stop 143. In some embodiments, the pedal arm stop 143 may protrude from a portion of the innermost surface 133*a* of the pedal arm 131 proximal to the pedal pad end 132*a* and distal to the pivot end 132*b*. In other embodiments, the pedal arm stop 143 may be positioned anywhere along the pedal arm 131. The housing 110 may further include a downstop 117 that may be opposed to the pedal arm stop 143 and may protrude from the housing 110. The downstop 117 may be positioned as least partially within a receiving recess 183 of the housing 110 in a snap fit configuration. This is non-limiting and the downstop 117 may be coupled to the housing 110 using a fastener such as, without limitation, a screw, bolt, rivet, weld, epoxy, adhesive, and/or the like. The downstop 117 may be formed by a resilient material such as, without limitation, rubber, silicone, and the like. Accordingly as best shown in FIG. 3, the pedal arm stop 143 may be configured to contact the downstop 117 at the maximum travel position 119, thereby defining a maximum travel of the pedal arm 131 along the depression travel arc illustrated by arrow 120. In some embodiments, the downstop 117 may compress a predetermined amount thereby providing an additional pedal effect force felt by the driver in addition to the emulator assembly 186, until the maximum travel of the pedal arm 131 is reached thus maximizes the pedal effort force.

That is, the pedal arm stop 143 and the downstop 117 may define the maximum travel position 119 from the resting position 118 of the pedal arm 131 along the depression travel arc illustrated by arrow 120 when the force 181 is applied at the pedal pad end 132a.

Figure 4A:
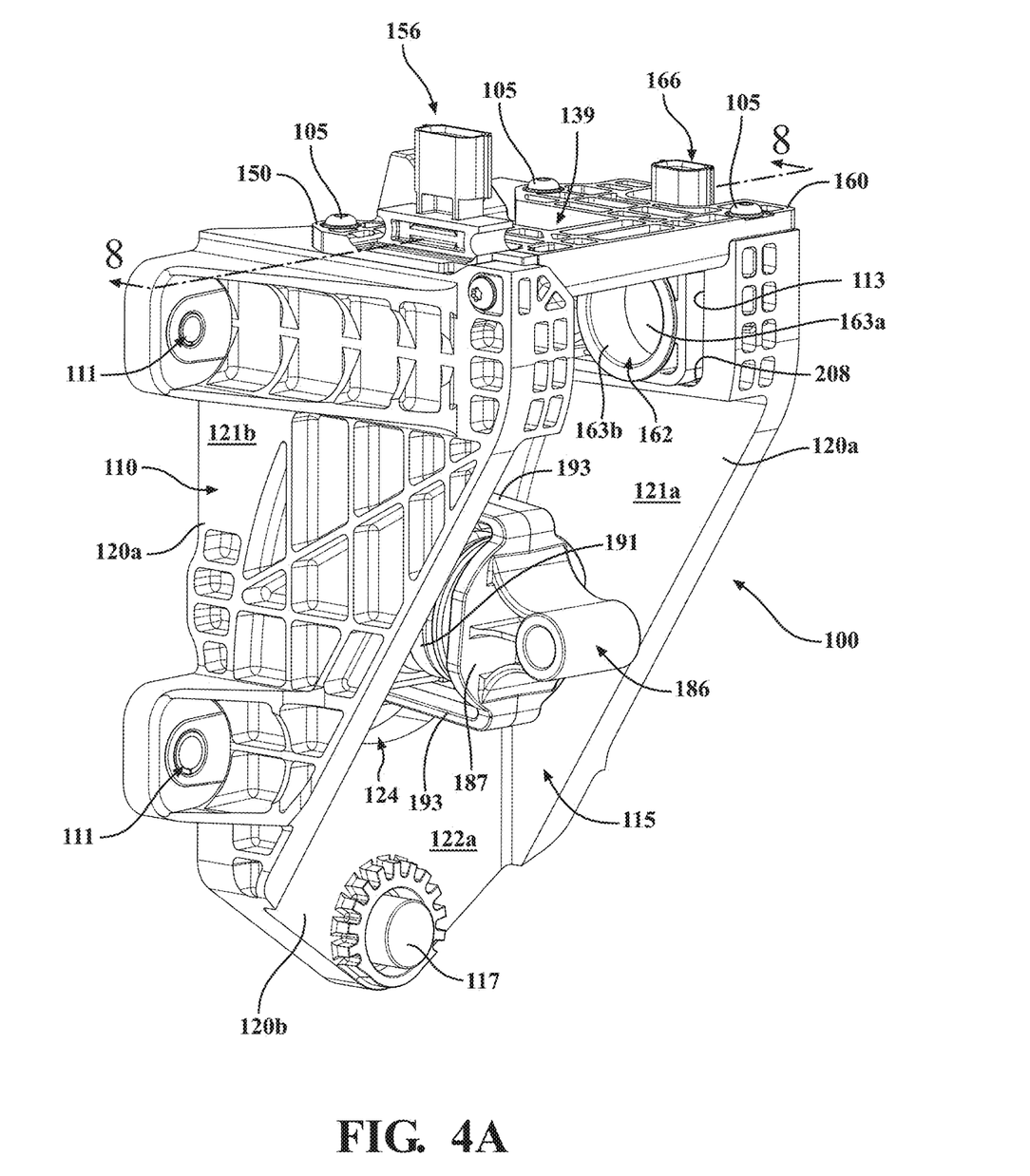
FIG. 4A schematically depicts a front perspective view of the example pedal assembly of FIG. 1 without the pedal arm shown, according to one or more embodiments shown and described herein.
Figure 4B:
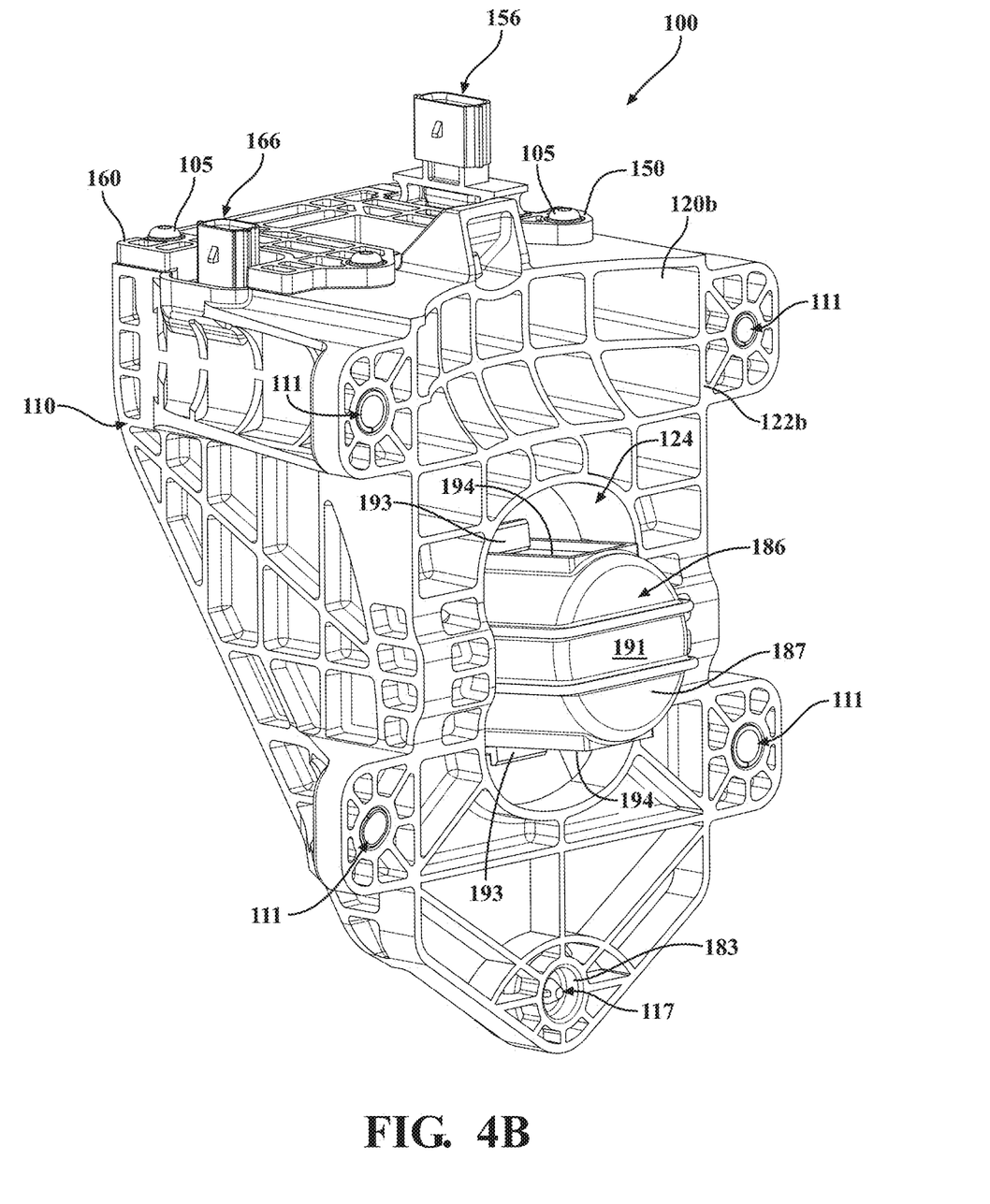
FIG. 4B schematically depicts a rear perspective view of the example pedal assembly of FIG. 4A, according to one or more embodiments shown and described herein.

Referring back to FIGS. 1-3 and to FIGS. 4A-4B, the example pedal assembly 100 may further include the emulator assembly 186 for providing a pedal effort force and for biasing the pedal arm 131 to the resting position 118. The emulator assembly 186 may include an emulator assembly housing 187, at least one biasing member, depicted as a pair of biasing members 188a, 188b positioned within a cavity 189 defined by the emulator assembly housing 187, and an elongated member 190 coupling the emulator assembly housing 187 to the innermost surface 133a of the pedal arm 131. As best shown in FIG. 3, the elongated member 190 of the emulator assembly 186 may be configured to provide a biasing force, depicted by arrow 192 provided via at least one of the biasing members 188a, 188b against the depression travel arc 120 when the force 181 is applied at the pedal pad end 132.

The elongated member 190 may slidably engage with an outer surface 191 of the emulator assembly housing 187 through a plurality of arm members 193. The outer surface 191 of the emulator assembly housing 187 may further include a plurality of channels 194 sized to receive the plurality of arm members 193 of the elongated member 190. Thereby, the plurality of arm members 193 and the plurality of channels 194 may together define and bound an emulator assembly compression path 195 through which the plurality of arm members 193 of the elongated member 190 translate as the force 181 is applied to and removed from the pedal pad end 132.

In some embodiments, the at least one biasing member is depicted as the pair of biasing members 188a, 188b positioned within the cavity 189 defined by the emulator assembly housing 187. Each of the pair of biasing members 188a, 188b may be formed of any material that may be configured to exhibit a bias towards returning to an original pre-stressed shape, such as, but not limited to, a spring, rubber, silicone, or any other elastic and compressible material or configuration known in the art. Accordingly, each of the pair of biasing members 188a, 188b may operate to simulate a fluid system, such as a hydraulic system, that is based on a speed system. That is, the faster an operator depresses onto the pedal pad 130 of the pedal arm 131, the harder or more difficult the pedal arm 131 is to depress or further pivot, commonly known as a pedal effort force.

In at least one embodiment, the pair of biasing members 188a, 188b may be coaxially aligned such that the biasing member 188b may have a smaller outer diameter than an inner diameter of the biasing member 188a, whereby the biasing member 188b is at least partially nested within the biasing member 188b. As such, the pair of biasing members 188a, 188b may be a redundant biasing system. Additionally or alternatively, the emulator assembly 186 may further include a third biasing member assembly 196, which includes a biasing member cradle 197a, and a second pair of biasing members 197b, 197c. As such, the third biasing member assembly 196 may make the emulator assembly 186 a two-stage assembly. The second pair of biasing members 197b, 197c may be coaxially aligned such that the biasing member 197c may have a smaller outer diameter than an inner diameter of the biasing member 197b, whereby the biasing member 197c is at least partially nested within the biasing member 197b. As such, the second pair of biasing members 197b, 197c may be a redundant biasing system. Both the second pair of biasing members 197b, 197c are positioned within the biasing member cradle 197a and are configured to bias the against the biasing member cradle 197a, which in turn applies a force to the pair of biasing members 188a, 188b, thereby generating a different pedal effect force against the foot of the driver based on the amount of force 181 that is applied to the pedal pad 130. Each of the second pair of biasing members 197b, 197c may be formed of any material that may be configured to exhibit a bias towards returning to an original pre-stressed shape, such as, but not limited to, a spring, rubber, silicone, or any other elastic and compressible material or configuration known in the art.

The emulator assembly 186 may be received within the cavity 115 and may be coupled top the housing 110 via a first mounting protrusion 218a and a second mounting protrusion 218b movably coupled to the inner surface 121a of the sidewalls 120a of the housing. For example, bushing or other devices may be used to allow for the first mounting protrusion 218a and the second mounting protrusion 218b to be movably coupled to the inner surface 121a of the sidewalls 120a of the housing. Further because the emulator assembly 186 is positioned within the cavity of the housing 110 and extending through at least a portion of bore 124, the housing 110 and the pedal arm 131 assisting in maintaining the position of the emulator assembly 186 relative to the housing 110 and the pedal arm 131.

Now referring back to FIGS. 6-8, each of the first member 150 and the second member 160 of the retaining assembly 104 may be configured to removably couple to the housing 110, such as within the retaining recess 113 of the housing 110. For example, each of the first member 150 and the second member 160 may include a receiving groove 202, 206 extending within a bottom surface 200, 204 respectively. As best illustrated in at least by FIG. 8, the receiving groove 202, 206 may be configured to receive corresponding one of a pair of retaining protrusions 114 extending from an upper surface 208 of the retaining recess 113 of the housing 110 and spaced apart from one another such that each of the first member 150 and the second member 160 are releasably retained or otherwise coupled to the housing 110 within the retaining recess 113.

Referring now to FIGS. 7-8, at least one of the first member 150 and the second member 160 may further include a nesting protrusion 210 and the other member may include a nesting aperture 212, such that the first and second members 150, 160 may be configured to nest within each other. In the depicted embodiment, the first member 150 includes the nesting protrusion 210 that extends from the an upper surface 214 and the second member 160 includes the nesting aperture 212 positioned within, or integrated within and extending from the upper portion 216 and that is sized and shaped to receive the nesting protrusion 210. In other embodiments, the first member 150 may include the nesting aperture 212 and the second member 160 may include the nesting protrusion 210. As such, in embodiments, a portion of the first member 150 overlies a portion of the second member 160 to removably couple the first and second members 150, 160, or vice versa, where a portion of the second member 160 overlies a portion of the first member 150 to removably couple the first and second members 150, 160 such as a single monolithic structure to provide stability to the pair of protrusions 135 along a rotation axis.

In some embodiments, the nesting protrusion 210 may be received within the nesting aperture 212 in a snap fit configuration, such that the first member 150 is coupled to the second member 160 in a snap fit arrangement together as a single structure. In other embodiments, the nesting protrusion 210 may be received within the nesting aperture 212 to align or guide a connection between the first member 150 and the second member 160 and at least one fastener may be used to couple the first member 150 and the second member 160 together as a single structure. For example, and without limitation, the at least one fastener may include a screw, bolt and nit, rivet, weld, epoxy, adhesive, hook and loop, and/or the like.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A pedal assembly comprising:
   a housing;
   a retaining assembly configured to removably couple to the housing, the retaining assembly including:
      a first member having a first receiving cavity and a first sensor assembly, and
      a second member having a second receiving cavity and a second sensor assembly, and
   a pedal arm having a pedal pad end and an opposite pivot end, a first protrusion extending from one side of the pivot end to be movably received within the first receiving cavity, and a second protrusion extending from the opposite side of the one side of the pivot end to be movably received within the second receiving cavity,
   wherein when a force applied on the pedal pad end moves the first protrusion within the first receiving cavity and the second protrusion within the second receiving cavity, the first sensor assembly and the second sensor assembly independently sense the movement of the first protrusion and the second protrusion respectively.

2. The pedal assembly of claim 1, wherein the first sensor assembly is configured as a Hall Effect sensor to sense the movement of the first protrusion.

3. The pedal assembly of claim 2, further comprising:
   a target positioned within the first protrusion or extending in a longitudinal direction from a terminating surface of the first protrusion such that the target moves with the first protrusion, and wherein the Hall Effect sensor is configured to sense the movement of the target.

4. The pedal assembly of claim 3, further comprising:
   a target carrier member having at least one resilient member extending from a coupling surface and configured to engage with the terminating surface of the first protrusion to define a predetermined airgap between the target and the Hall Effect sensor.

5. The pedal assembly of claim 1, wherein the second sensor assembly is configured as an inductive sensor to sense the movement of the second protrusion.

6. The pedal assembly of claim 5, further comprising:
   a coupler positioned within the second protrusion or extending in a longitudinal direction from a terminating surface of the second protrusion such that the coupler moves with the second protrusion; and
   the inductive sensor is configured to sense the movement of the second protrusion through movement of the coupler.

7. The pedal assembly of claim 6, further comprising:
   a coupler carrier member having at least one resilient member extending from a coupling surface and configured to engage with the terminating surface of the second protrusion to define a predetermined airgap between the coupler and the inductive sensor.

8. The pedal assembly of claim 1, wherein at least one of:
   a portion of the first member overlies a portion of the second member to removably couple the first and second members; or
   the portion of the second member overlies the portion of the first member to removably couple the first and second members.

9. The pedal assembly of claim 1, wherein the housing comprises:
   a retaining recess configured to receive the first member and the second member, the retaining recess having a pair of retaining protrusions that are spaced apart and extend in a vertical direction from a surface of the retaining recess; and
   wherein the first member and the second member each include a receiving groove configured to receive the corresponding one of the pair of retaining protrusions of the retaining recess when the first member and the second member are positioned within the retaining recess to removably couple the first member and the second member to the housing.

10. The pedal assembly of claim 1, further comprising:
    an emulator assembly coupled to the pedal arm, the emulator assembly configured to provide a pedal effort force against a depression travel arc of the pedal arm as a force is applied at the pedal pad end.

11. An assembly comprising:
    a housing having a retaining recess, the retaining recess having a pair of spaced apart protrusions extending from an upper surface,
    a first member having a first receiving cavity, a first sensor assembly, and a first receiving groove configured to receive one of the pair of spaced apart protrusions when positioned within the retaining recess;
    a second member having a second receiving cavity, a second sensor assembly and a second receiving groove configured to receive the other one of the pair of spaced apart protrusions when positioned within the retaining recess; and
    a pedal arm having a pivot end, the pivot end having integrated a first protrusion and a second protrusion extending from opposite sides of the pivot end, the first protrusion is movably received within the first receiving cavity and the second protrusion is movably received within the second receiving cavity,
    wherein a movement of the pivot end moves the first protrusion within the first receiving cavity and the second protrusion within the second receiving cavity and the first sensor assembly and the second sensor assembly independently detect the movement of the first protrusion and the second protrusion respectively.

12. The assembly of claim 11, wherein the first sensor assembly is configured as a Hall Effect sensor to sense the movement of the first protrusion.

13. The assembly of claim 12, further comprising:
a target positioned within the first protrusion or extending in a longitudinal direction from a terminating surface of the first protrusion such that the target moves with the first protrusion, and wherein the Hall Effect sensor is configured to sense the movement of the target.

14. The assembly of claim 13, further comprising:
a target carrier member having at least one resilient member extending from a coupling surface and configured to engage with the terminating surface of the first protrusion to define a predetermined airgap between the target and the Hall Effect sensor.

15. The assembly of claim 11, wherein the second sensor assembly is configured as an inductive sensor to sense the movement of the second protrusion.

16. The assembly of claim 15, further comprising:
a coupler positioned within the second protrusion or extending in a longitudinal direction from a terminating surface of the second protrusion such that the coupler moves with the second protrusion; and
the inductive sensor is configured to sense the movement of the second protrusion through movement of the coupler.

17. The assembly of claim 16, further comprising:
a coupler carrier member having at least one resilient member extending from a coupling surface and configured to engage with the terminating surface of the second protrusion to define a predetermined airgap between the coupler and the inductive sensor.

18. The assembly of claim 11, wherein at least one of:
a portion of the first member overlies a portion of the second member to removably couple the first and second members; or
the portion of the second member overlies the portion of the first member to removably couple the first and second members.

19. The assembly of claim 11, further comprising:
an emulator assembly coupled to the pedal arm, the emulator assembly configured to provide a pedal effort force against a depression travel arc of the pedal arm.

20. A pedal assembly comprising:
a housing;
a first member removably coupled to the housing, the first member having a first receiving cavity and a first sensor assembly;
a second member removably coupled to the housing, the second member having a second receiving cavity and a second sensor assembly, the first sensor assembly utilizing a different sensing technology than the second sensor assembly; and
a pedal arm having a pedal pad end and an opposite pivot end, a first protrusion extending from one side of the pivot end to be movably received within the first receiving cavity, and a second protrusion extending from the opposite side of the one side of the pivot end to be movably received within the second receiving cavity;
an emulator assembly coupled to the pedal arm, the emulator assembly configured to provide a pedal effort force against a depression travel arc of the pedal arm as a force is applied at the pedal pad end,
wherein a force is applied on the pedal pad end moves the first protrusion within the first receiving cavity and the second protrusion within the second receiving cavity, the first sensor assembly and the second sensor assembly independently sense the movement of the first protrusion and the second protrusion respectively.

21. A pedal assembly comprising:
a housing;
a retaining assembly configured to removably couple to the housing, the retaining assembly including:
a first member having a first receiving cavity and a first sensor assembly,
a second member having a second receiving cavity and a second sensor assembly, and
a pedal arm having a pedal pad end and an opposite pivot end, the pivot end having a first protrusion and a second protrusion extending from opposite sides of the pedal arm, wherein the first protrusion and the second protrusion are movably received within the first receiving cavity and the second receiving cavity, respectively,
wherein when a force applied on the pedal pad end moves the first protrusion within the first receiving cavity and the second protrusion within the second receiving cavity, the first sensor assembly and the second sensor assembly independently sense the movement of the first protrusion and the second protrusion, respectively.

* * * * *